SARAH L. BARNETT & SIMON BEERY.
Improvement in Carriage Top-Prop Blocks.
No. 4,621.
Reissued Nov. 7, 1871.
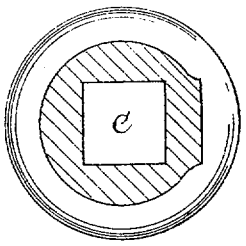
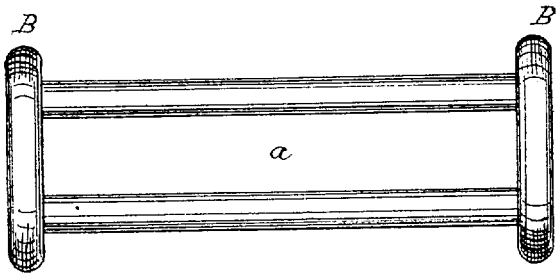
Witnesses
A. W. Maleamson Jr.
Geo. Geo. Smith
Sarah L. Barnett
Simon Beery
by
Dewey & Todd
their Attorneys.
AM. PHOTO-LITHOGRAPHIC CO. N.Y. (OSBORNE'S PROCESS.)

UNITED STATES PATENT OFFICE.

SARAH L. BARNETT AND SIMON BEERY, OF URBANA, OHIO, ASSIGNEES, BY MESNE ASSIGNMENTS, OF WILLIAM N. BARNETT, DECEASED.

IMPROVEMENT IN CARRIAGE-TOP PROP-BLOCKS.

Specification forming part of Letters Patent No. 52,126, dated January 23, 1866; reissue No. 4,621, dated November 7, 1871.

*To all whom it may concern:*

Be it known that WILLIAM N. BARNETT, of the town of Urbana, in the county of Champaign and State of Ohio, did invent a new and Improved Carriage-Top Prop-Block; and we do hereby declare that the following is a description of the same.

Carriage-top prop-blocks have heretofore been made of a cylindrical form, of wood and leather, and the surface against which the carriage-bow rests being raised from the main body of the block and also composed of leather. Such prop-blocks were not durable. They also occasioned the back-bow and other parts of the top to wear away rapidly.

This invention mainly consists in a prop-block, the characteristic features of which are as follows: First, a surface projecting from the main body of the prop-block, which acts as an elastic cushion and rest for the back-bow; and, second, the whole prop-block being composed of India rubber, or equivalent material.

The drawing shows a prop-block which embodies the features of this invention; but it is not proposed to limit the invention to the form of parts therein shown.

A shows the projecting surface upon the main body. B B is a projecting bead, which may be formed at each end, if desired, in order to give the prop-block a more ornamental and finished appearance, and which acts partially as a washer. C is a square hole, made longitudinally through the center of the block, and by means of which the attachment to the carriage-iron of the block may be made in a secure manner.

The whole prop-block being composed of India rubber, or its equivalent, the wearing of parts is greatly diminished.

We claim as the invention of said WILLIAM N. BARNETT—

1. A carriage-prop block, when composed of India rubber and having a projecting surface to serve as a cushion, substantially as described.

2. A carriage-prop block, when composed of India rubber having a projecting surface and projecting end pieces, substantially as described.

3. A carriage-prop block, substantially as described, when constructed with a square hole longitudinally through the center thereof, to serve as a means of attachment.

SARAH L. BARNETT.
SIMON BEERY.

Witnesses:
S. B. GROVE,
CLARA A. BOPE.

(31)